United States Patent [19]
Fleming

[11] Patent Number: 5,247,284
[45] Date of Patent: Sep. 21, 1993

[54] GRAPHICAL METHOD OF INPUTING TIME VALUES

[75] Inventor: Steve S. Fleming, Dallas, Tex.

[73] Assignee: International Business Machines Corporation, Armonk, N.Y.

[21] Appl. No.: 693,741

[22] Filed: Apr. 30, 1991

[51] Int. Cl.[5] .......................................... G09G 5/00
[52] U.S. Cl. ................................................ 345/156
[58] Field of Search ............... 340/706, 707, 709, 710, 340/712; 368/185, 281, 242; 395/155, 161

[56] References Cited

U.S. PATENT DOCUMENTS

| | | | |
|---|---|---|---|
| 4,362,398 | 12/1982 | Jackson | 368/242 |
| 4,725,694 | 2/1988 | Auer et al. | 340/712 |
| 4,764,910 | 8/1988 | Ichikawa | 368/185 |
| 4,920,365 | 4/1990 | Marx et al. | 368/242 |
| 5,050,105 | 9/1991 | Peters | 340/721 |

FOREIGN PATENT DOCUMENTS 0076980  6/1980  Japan ................................ 368/240

OTHER PUBLICATIONS

"Microsoft Windows 3.0 Users Guide by Logitech" 1990, pp. 17, 145, 188, 189, 398, 399.

*Primary Examiner*—Jeffery Brier
*Attorney, Agent, or Firm*—Jonathan E. Jobe, Jr.

[57] ABSTRACT

A method of displaying and inputting time values in a computer system that includes a display screen and a user operable pointing device. The method includes displaying on the screen a representation of an analog clock with hands that the user can position with the pointing device to input time values.

12 Claims, 5 Drawing Sheets

GRAPHICAL METHOD OF INPUTING TIME VALUES

BACKGROUND OF THE INVENTIONS

1. Field of the Invention

The present invention relates generally to graphical computer user interfaces, and more particularly to a graphical computer user interface that allows the user to input time values with a pointing device such as a mouse.

2. Description of the Prior Art

Current systems provide for both the entry of time information (input) and the display of time information (output). Time information is important for many user applications, including, for example, calendar applications.

Current systems provide entry fields for input of time information, such as the starting and ending times of a meeting. However, entry fields require the user to use the keyboard to input information. This can be time consuming for users who are not skilled typists. Entry field input of time information is complicated by the fact that time information may be presented using different formats according to country and user preferences. This complicates the user interface and implementation of a time entry field, since different alternatives exist for display and typing of the same time.

Some current systems provide a graphic display of time of day information by graphically depicting an analog clock. However, these systems still require the user to use an entry field to adjust the clock's time setting, such as for a change to daylight saving time or correction of the clock time.

Some current systems provide for entry of time information by using entry fields whose values can be adjusted with spin buttons. If a default time is provided, this approach does allow a time to be entered without a keyboard. However, this approach has problems with alternate time formats, as described above for entry fields. The mouse operations required for spin button control may also be very tedious, since a large number of "spins" may be required and the user also has to move the mouse back and forth between the numeric area and the spin buttons. This is because the user must repeatedly select which numbers, such as hours or minutes, are being spun. It would be possible to provide more than one set of spin buttons to work around this problem. However, the graphic distraction and potential user confusion with more than one spin button makes this approach unattractive.

SUMMARY OF THE INVENTION

In the present invention, a user can enter time information by direct use of a mouse or other pointing device. Time information is displayed using a graphical representation of an analog clock with the clock hands pointing according to the current time setting. To change the time setting, the user selects a point within the clock face using the pointing device. The appropriate clock hand is then repositioned to the selected point, thus setting the time. In the preferred embodiment, the clock face is graphically drawn such that the user can discern two concentric circular areas. Selecting in the outer area will reposition the clock minute hand, while selecting in the inner area will reposition the clock hour hand.

DESCRIPTION OF THE PREFERRED EMBODIMENT

Figure 1:
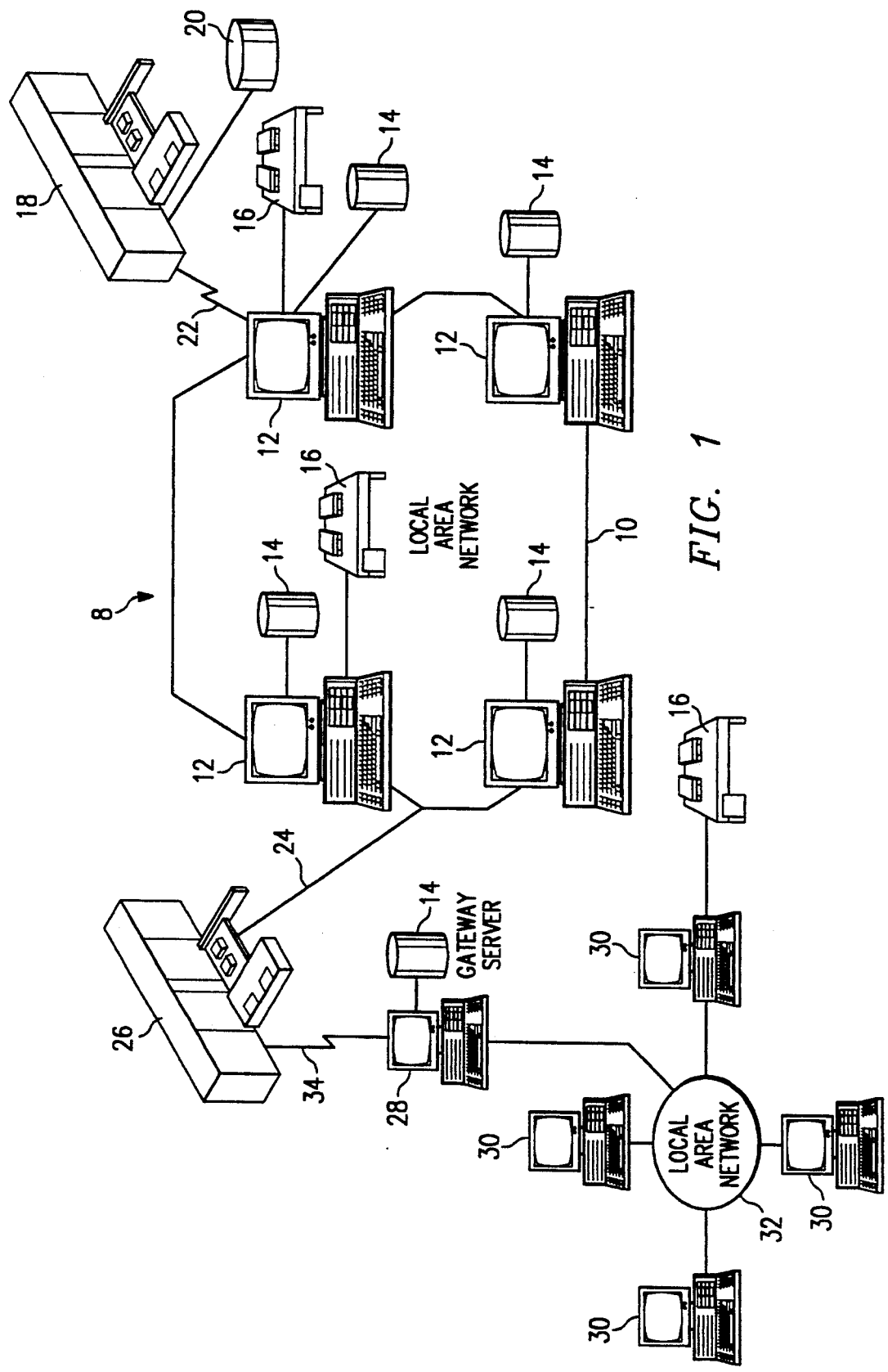
FIG. 1 is a pictorial representation of a data processing system that may be used to implement the method of the present invention.

Referring now to the drawings, and first to FIG. 1, there is depicted a pictorial representation of a data processing system 8 which may be utilized to implement the method of the present invention. Data processing system 8 may include a plurality of networks, such as local area networks 10 and 32, each of which preferably includes a plurality of individual personal computers, 12 and 30, respectively. Of course, those skilled in the art will recognize that a plurality of interactive work stations, rather than personal computers, coupled to a host processor may be utilized for each such network. Each individual computer may be coupled to a storage device 14 or a printer 16. One or more of such storage devices 14 may be utilized to store applications or resource objects that may be periodically accessed by any user within data processing system 8. Each such application or resource object stored within a storage device 14 is associated with a resource manager, which is responsible for maintaining and updating all resource objects associated therewith.

Data processing network 8 may also include multiple main frame computers such as main frame computer 18, which may be preferably coupled to local area network 10 by means of communications link 22. Main frame computer 18 may also be coupled to a storage device 20 which may serve as remote storage for local area network 10 Similarly, local area network 10 may be coupled by a communications link 24 through a sub-system control unit 26 and communications link 34 to a gateway server 28. Gateway server 28 is preferably an individual computer or interactive work station which serves to link local area network 32 to local area network 10. Resource objects may be stored within storage device 20 and controlled by main frame computer 18, as resource manager for the resource objects thus stored.

Figure 2:
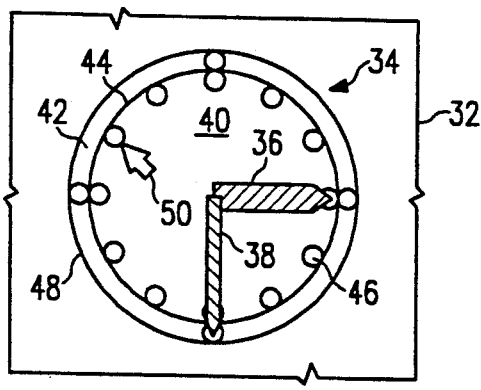
FIG. 2 is a pictorial view of a portion of a computer display screen with the clock face of the present invention displayed thereon and illustrating the setting of the hour hand.

Referring now to FIG. 2, a portion of a computer display screen as designated by the numeral 32. Display screen 32 has displayed thereon a representation of an analog clock face, designated generally by the numeral 34. Clock face 34 includes a graphical representation of an hour hand 36 and a minute hand 38, each of which is positional about clock face 34 in the manner of the hands on a normal mechanical clock.

Clock face 34 includes a first, radially inner, display area 40, and a second, radially outer, display area 42. Display areas 40 and 42 are separated by a circular border 44. First display area 40 has positioned therein twelve hour markers 46 that correspond to the hour markings on a mechanical clock. In the preferred embodiment, second display area 42 has positioned therein four minute markers 48 that mark fifteen minute intervals about clock face 34.

In FIG. 2, a time of 3:30 is indicated. The method of the present invention provides a graphical way in which time values may be inputted to the computer system. For example, the beginning and ending time for calendar events may be inputted into a calendar application graphically without the need to use the keyboard.

In FIG. 2, a mouse pointer is indicated by the numeral 50. As is well known to those skilled in the art, mouse pointer 50 may be moved about the computer display screen by means of a mouse (not shown). In FIG. 2, mouse pointer 50 is pointing to the 10:00 o'clock marker in first display area 40. If the user desires to set hour hand 36 to the 10:00 o'clock position, the user selects the 10 marker by clicking mouse button number one (not shown). As will be explained in detail hereafter, in the preferred embodiment of the invention, the system calculates the hand setting from the position of mouse pointer 50. Mouse pointer 50 does not need, necessarily, to be pointing to a marker in order to select a time value. The markers are provided for the convenience of the user.

Figure 3:
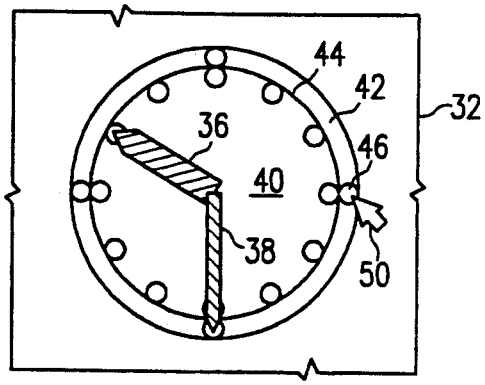
FIG. 3 is a pictorial view similar to FIG. 2 illustrating the setting of the minute hand.
Figure 4:
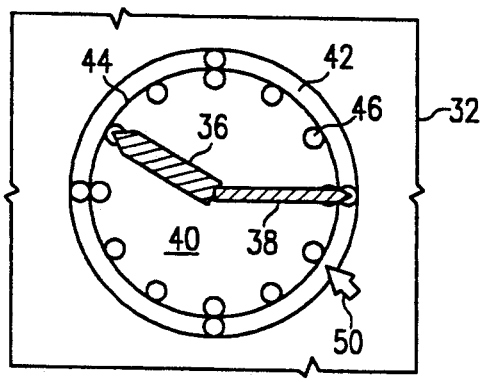
FIG. 4 is a pictorial view similar to FIG. 3 further illustrating the setting of the minute hand.

Referring now to FIG. 3, the portion 32 of the display screen is shown a short time after the 10:00 o'clock marker 46 was selected. Hour hand 36 is shown now in the 10:00 o'clock position rather than the 3:00 o'clock position. If the user desires to reset the position of minute hand 38, the user does so by positioning mouse pointer 50 in second display area 42 and selecting that position by clicking mouse button number one. In FIG. 3, mouse pointer 50 is shown pointing to the marker 46 corresponding to 15 minutes after the hour. By clicking mouse button number one, minute hand 38 moves to the 15 minute past the hour position, as shown in FIG. 4. When hands 36 and 38 are repositioned, the time value inputs to the application are automatically updated.

Figure 5:
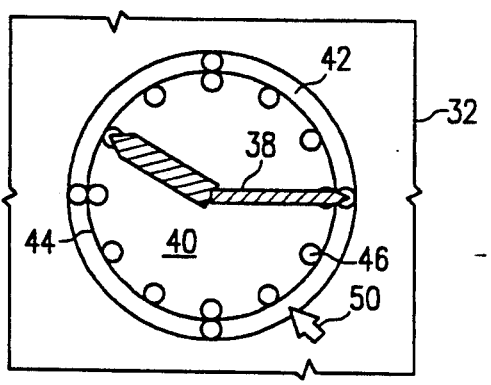
FIG. 5 is a pictorial view similar to FIG. 4 showing further details of the setting of the minute hand.
Figure 6:
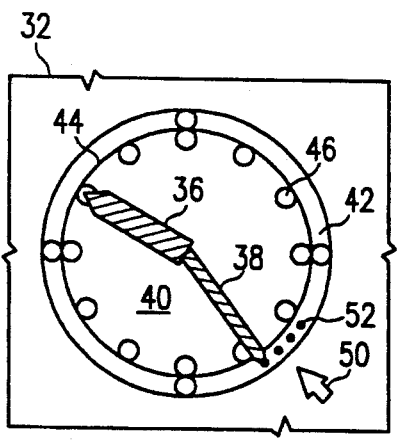
FIG. 6 is a pictorial view similar to FIG. 5 illustrating further details of the setting of the minute hand.

Most events are scheduled to start or end at times based on multiples of fifteen minutes. For example, most appointments or meetings would be scheduled to begin at times like 10:30 or 1:45. Only the busiest business or governmental executive would have calendar events scheduled to begin at odd times, such as 2:13. However, referring to FIGS. 5 and 6, the method of the present invention allows the user to input a time down to the nearest minute. In FIG. 5, mouse pointer 50 is shown positioned in second display area 42 at a position about 24 minutes after the hour. By clicking mouse button number one with pointer 50 so positioned, minute hand 38 is moved to the 24 minute after position as shown in FIG. 6. For the convenience of the user, minute markers 52 are displayed in FIG. 6 whenever minute hand 38 is not on a 5 minute interval.

In the embodiment of the invention shown and described, hour and minutes values may be inputted and displayed. However, those skilled in the art, given the benefit of the present description, will recognize that a second hand and a third display area may be added to allow inputs and displays down to the nearest second.

Figure 8:
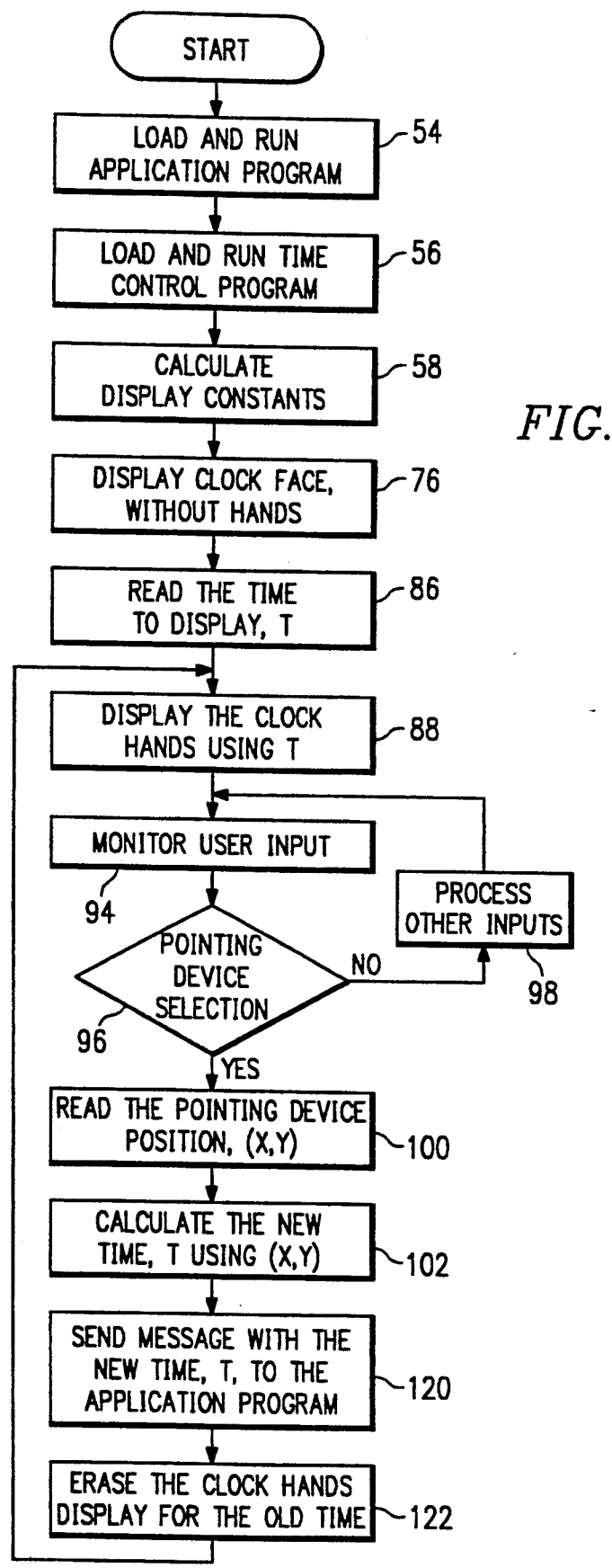
FIG. 8 is a flow chart of a preferred software implementation of the method of the present invention.

Referring now to FIG. 8, there is a flow chart showing a preferred software implementation of the method of the present invention. Initially, an application program is loaded and started at block 54 and the time control program is loaded and started at block 56. After the application and time control programs are running, the display constants are calculated as indicated generally at block 58.

Figure 7:
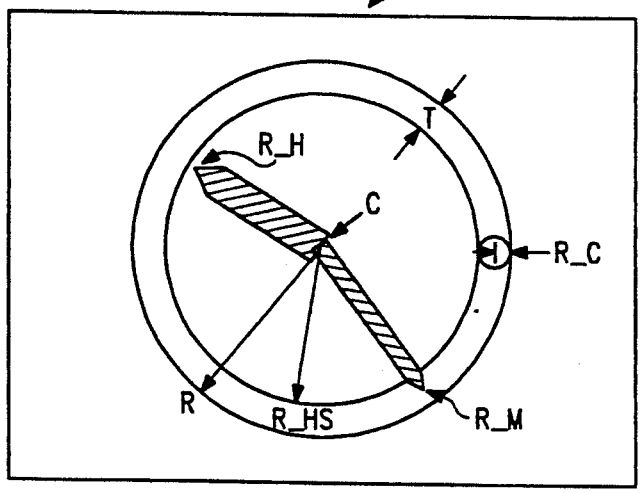
FIG. 7 is a view illustrating the construction of the clock face of the present invention.
Figure 9:
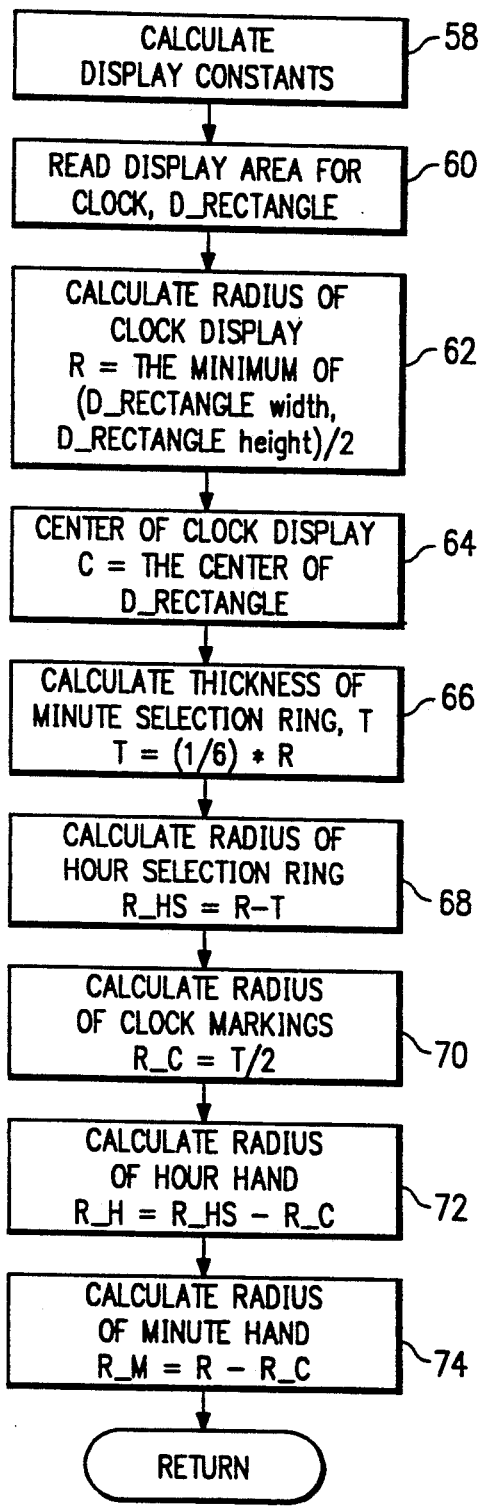
FIG. 9 is a flow chart showing the "CALCULATE DISPLAY CONSTANTS" routine of FIG. 8.

Referring to FIG. 9, there is shown the details of a preferred implementation of the "CALCULATE DISPLAY CONSTANTS" routine of the method of the present invention. The display constants are shown graphically in FIG. 7 and the display constant calculation routine first reads the display area for clock at block 60. The clock is displayed in a rectangle "D_RECTANGLE". At block 62, the system calculates the radius of R of the clock display. R is the minimum of D_RECTANGLE width or D_RECTANGLE height divided by 2. Then, the system locates the center C of the clock display at the center of D_RECTANGLE at block 64. After C has been located, the system calculates, at block 66, the thickness T of the minute selection ring, which corresponds to second display area 42 of FIGS. 2–6. In the preferred embodiment, T is equal to R divided by 6. Next, at block 68, the system calculates the radius R_HS of the hour selection ring, which corresponds to first display area 40 of FIGS. 2–6. By inspection, radius R_HS of the hour selection ring is equal to radius R of the clock display minus thickness T of the minute selection ring. Then, at block 70, the system calculates the radius R_C of the clock markings, which is defined to be equal to thickness T of the minute selection ring divided by 2. Finally, the radii of the hour and minutes hands are calculated at blocks 72 and 74, respectively. The radius R_H of the hour hand is defined to be the radius R_HS of the hour selection ring minus the radius R_C of the clock markings. The radius R_M of the minutes hand is defined to be the radius R of the clock display minus the radius R_C of the clock markings.

Figure 10:
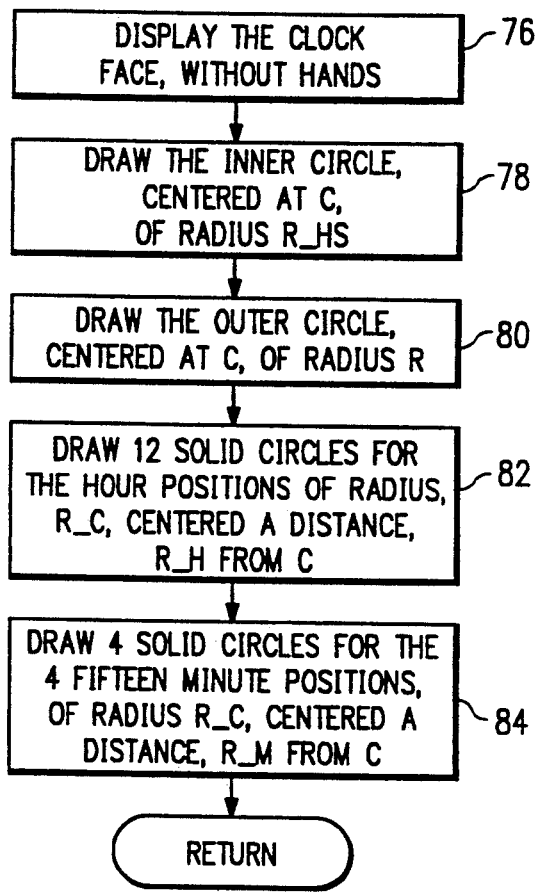
FIG. 10 is a flow chart showing the "DISPLAY THE CLOCK FACE, WITHOUT HANDS" routine of FIG. 8.

After the display constants have been calculated, the system returns to FIG. 8 and the clock face is displayed without hands, as indicated generally at block 76. A preferred implementation of the "DISPLAY THE CLOCK FACE, WITHOUT HANDS" routine is shown in FIG. 10. First, the system draws the inner circle, which is border 44 in FIGS. 2–6, centered at C of FIG. 7 with a radius R_HS, as indicated at block 78. Then, at block 80, the system draws the outer circle of FIG. 7, again centered at C with radius R. After the circles have been drawn, the system, at block 82 draws twelve (12) solid circles for the hour positions, each of radius R_C at a distance R_H from C and spaced thirty degrees apart about the hour selection ring. Finally, at block 84, the system draws four (4) solid circles for the 15 minute positions, each of radius R_C, centered a distance of R_M from center C and spaced ninety degrees apart.

Figure 11:
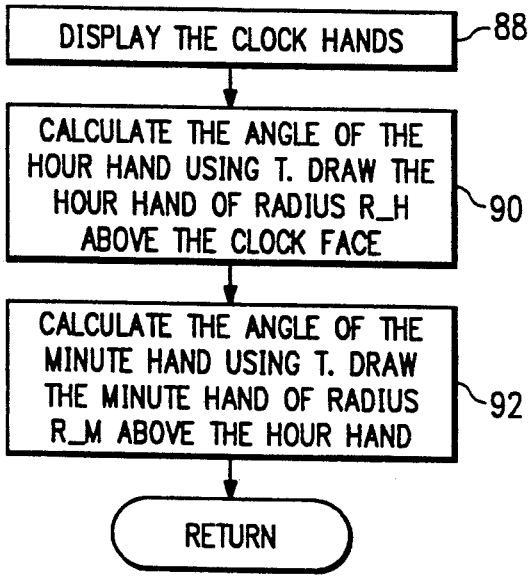
FIG. 11 is a flow chart showing the "DISPLAY THE CLOCK HANDS" routine of FIG. 8.

Referring again to FIG. 8, after the clock face, without hands, has been displayed, the system reads the time T to display at block 86. The time to be displayed can be the local time or some arbitrary default time. After the time T to be displayed has been read, the system displays the clock hands using T, as indicated generally by block 88. Referring to FIG. 11, in the "DISPLAY THE CLOCK HANDS" routine, the system calculates the angle of the hour hand using T and draws the hour hand with radius R_H above the clock face at block 90. Then the system calculates the angle of the minute hand using T and draws the minute hand of radius R_M above the hour hand at block 92.

After the clock hands have been displayed, the system returns to FIG. 8 to monitor user input at block 94. When there is a user input, the system tests, at decision block 96, whether the user input is a pointing device selection. If it is not, the system processes other inputs at block 98 and returns to monitor user input at block 94. If, on the other hand, the user input is a pointing device selection, the system reads the pointing device position in cartesian coordinates (X,Y) at block 100. Then, as indicated generally at block 102, the system calculates the new time, T, using (X,Y).

Figure 12:
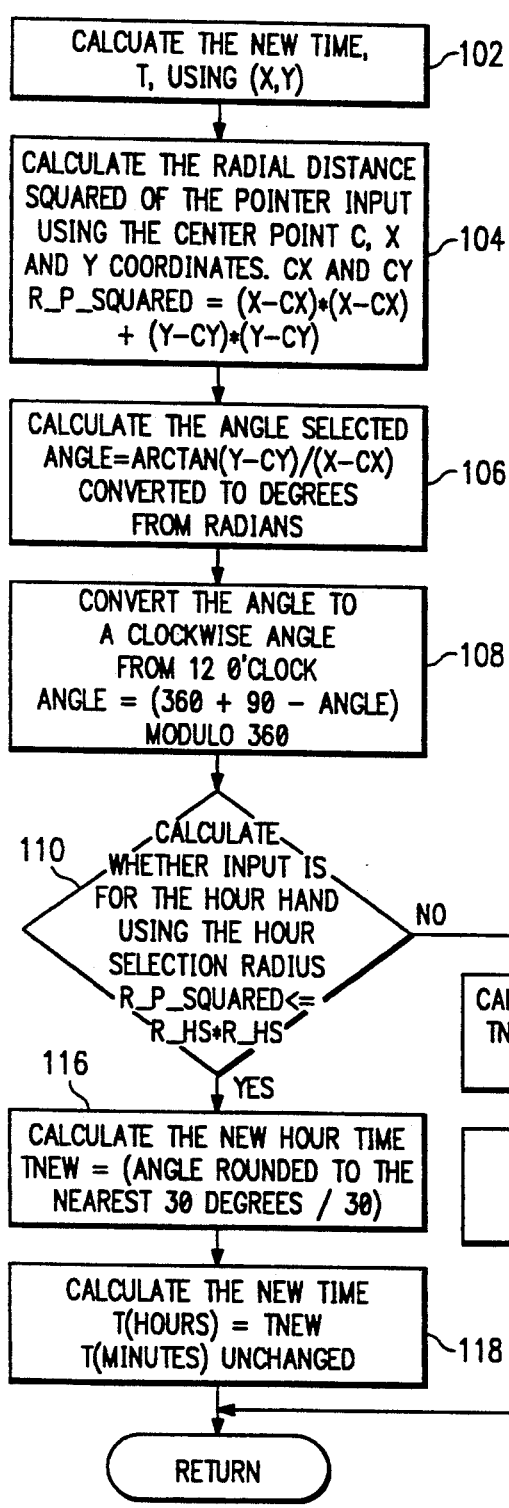
FIG. 12 is a flow chart showing the "CALCULATE THE NEW TIME, T, USING (X,Y)" routine of FIG. 8.

Referring to FIG. 12, the system first calculates the radial distance squared of the pointer input using the center point coordinates, which are CX and CY and the pointer position coordinates, which are X and Y. The radial distance squared is referred to R_P_SQUARED and it is equal to the quantity X minus CX squared plus the quantity Y minus CY squared. Then, at block 106, the angle of the selected point is calculated using the formula angle equals arctangent of the quantity Y minus CY divided by X minus CX expressed in degrees. Then, the angle calculated at block 106 is converted at block 108 to a clockwise angle from 12:00 o'clock using the formula angle equals the quantity 360 plus 90 minus angle modulo 360. Then, at decision block 110, the system tests whether the input is in the first display area, thereby indicating that an hour value is selected. More specifically, the system calculates whether R_P_SQUARED, which is the radial distance calculated at block 104, is less than or equal to R_HS_SQUARED. If not, the system, at block 112 calculates the new minutes time by the formula TNEW equals the angle rounded to the nearest six degrees divided by six. Then the system calculates the new time, at block 114, with the hours being unchanged and the minutes being equal to TNEW. Referring again to decision block 110, if the radius squared of the selection point from the center of the clock face is less than R_HS, the radius of the inner circle, the system calculates, at block 116, the new hour angle by the formula TNEW equals angle rounded to the nearest thirty degrees divided by thirty. Then the new time is calculated at block 118 with the hours equalling TNEW and the minutes being unchanged.

Figure 13:
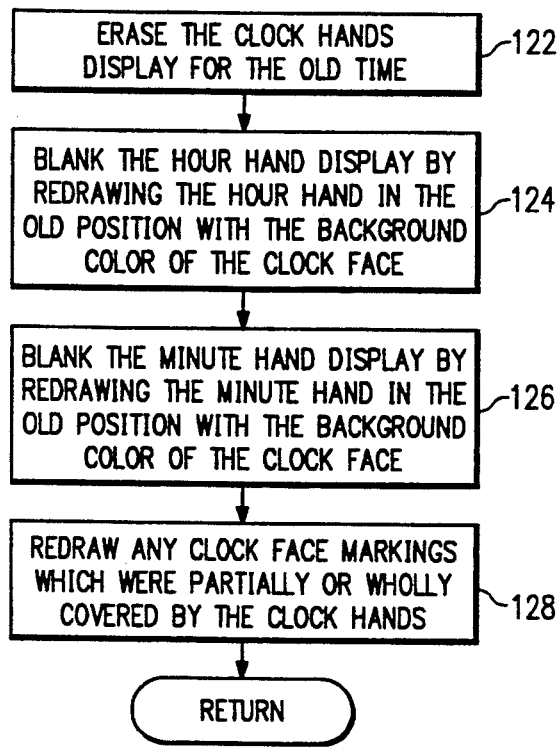
FIG. 13 is a flow chart showing the "ERASE THE CLOCK HANDS DISPLAY FOR THE OLD TIME" routine of FIG. 8.

Referring again to FIG. 8, after the new time has been calculated at block 102, a message is sent with the new time, T, to the application program at block 120. Then, at block 122, the clock hands display for the old time is erased. Referring to FIG. 13, which shows details of the "ERASE THE CLOCK HANDS DISPLAY FOR THE OLD TIME" routine, the system blanks the hour hand display by redrawing the hour hand in the old position with the background color of the clock face at block 124. Then, the system blanks the minute hand display by redrawing the minute hand in the old position with the background color of the clock face at block 126. Finally, the system redraws any clock face markings that were partially or wholly covered by the clock hands at block 128. After the clock hands have been erased at block 122 of FIG. 8, the system returns to block 88 and displays the clock hands using the new time T.

From the foregoing, it may be seen that the present invention allows a user to input time values, which may represent either time of day or elapsed time, using only a pointing device without the need for typing. The invention may be used in a variety of applications and those skilled in the art will recognize multiple uses for the invention. While the invention has been particularly shown and described with reference to a preferred embodiment, those skilled in the art will understand that various changes in form and detail may be made without departing from the spirit and scope of the invention. For example, certain features of the invention may be used independently of other features.

What is claimed is:

1. In a computer system that includes a graphical user interface and a user operable pointing device for providing graphical user interface input, a method of indicating a time value and providing user input of a time value, which comprises the steps of:
   a) displaying the time value using a graphical representation of an analog clock including a clock face with an hour hand and a minute hand;
   b) providing a first display area for user input via the pointing device to set the hour hand;
   c) providing a second display area, separate from the first display area, for user input via the pointing device to set the minute hand; and,
   d) automatically updating the time value and the display thereof to reflect user input.

2. The method as claimed in claim 1, including the steps of:
   a) providing the clock face with graphical representations of said first and second display areas.

3. The method as claimed in claim 1, wherein:
   a) said first display area is represented by a radially inner area of said clock face; and
   b) said second display area is represented by a radially outer area of said clock face.

4. The method as claimed in claim 1, including:
   a) providing a graphical guide to enable the user to select time inputs.

5. The method as claimed in 4, wherein said graphical guide includes a plurality of angularly spaced apart markers positioned about the center of said clock face.

6. The method as claimed in claim 1, including the steps of:
   a) selecting a point on said clock face;
   b) determining whether said selected point is in said first display area or said second display area; and,
   c) calculating the time value corresponding to said selected point.

7. In a computer system that includes a graphical user interface and a user operable pointing device for providing graphical user interface input, a method of indicating a time value and providing user input of a time value, which comprises the steps of:
   a) displaying the time value using a graphical representation of an analog clock including a clock face with an hour hand and a minute hand;

b) providing a first display area represented by a radially inner area of said clock face, for user input via the pointing device to set one of said hands;

c) providing a second display area, separate from the first display area and represented by a radially outer area of said clock face, for user input via the pointing device to set the other of said hands; and, d) automatically updating the time value and the display thereof to reflect user input.

8. The method as claimed in claim 7, wherein:

a) user input with said pointing device to said first display area changes the position of said hour hand; and b) user input with said pointing device to said second display area changes the position of said minute hand.

9. The method as claimed in claim 8, including:

a) providing a graphical guide to enable the user to select time inputs.

10. The method as claimed in 9, wherein said graphical guide includes a plurality of angularly spaced apart markers positioned about the center of said clock face.

11. The method as claimed in claim 7, including the steps of:

a) selecting a point on said clock face;

b) determining whether said selected point is in said first display area or said second display area; and, c) calculating the time value corresponding to said selected point.

12. In a computer system that includes a graphical user interface and a user operable pointing device for providing graphical user interface input, a method of indicating a time value and providing user input of a time value, which comprises the steps of:

a) displaying the time value using a graphical representation of an analog clock including a clock face with an hour hand and a minute hand;

b) providing a first display area on said clock face for user input via the pointing device to set the hour hand;

c) providing a second display area on said clock face, separate from the first display area, for user input via the pointing device to set the minute hand;

d) selecting a point on said clock face;

e) determining whether said selected point is in said first display area or said second display area;

f) calculating the time value corresponding to said selected point; and, g) automatically updating the time value and the display thereof to reflect user input.

* * * * *